(12) United States Patent
Ihara

(10) Patent No.: US 9,100,672 B2
(45) Date of Patent: Aug. 4, 2015

(54) DATA TRANSMITTING DEVICE AND DATA TRANSMITTING AND RECEIVING SYSTEM

(75) Inventor: Noriyuki Ihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 810 days.

(21) Appl. No.: 13/137,481

(22) Filed: Aug. 19, 2011

(65) Prior Publication Data

US 2012/0039396 A1    Feb. 16, 2012

Related U.S. Application Data

(63) Continuation of application No. PCT/JP2009/054682, filed on Mar. 11, 2009.

(51) Int. Cl.
| | |
|---|---|
| H04N 7/26 | (2006.01) |
| H04N 21/2362 | (2011.01) |
| H04N 21/236 | (2011.01) |
| H04N 21/2381 | (2011.01) |
| H04N 21/242 | (2011.01) |
| H04N 21/6437 | (2011.01) |

(52) U.S. Cl.
CPC ......... *H04N 21/2362* (2013.01); *H04N 21/236* (2013.01); *H04N 21/2381* (2013.01); *H04N 21/242* (2013.01); *H04N 21/6437* (2013.01)

(58) Field of Classification Search
None
See application file for complete search history.

(56) References Cited

U.S. PATENT DOCUMENTS

| | | | |
|---|---|---|---|
| 6,542,518 B1 | 4/2003 | Miyazawa | |
| 7,933,299 B2 | 4/2011 | Yoo | |
| 2001/0009604 A1 | 7/2001 | Ando et al. | |
| 2002/0003948 A1 | 1/2002 | Himeno et al. | |
| 2002/0044757 A1* | 4/2002 | Kawamura et al. | 386/46 |
| 2008/0232361 A1* | 9/2008 | Kimiyama et al. | 370/389 |
| 2008/0292263 A1* | 11/2008 | Van Gestel | 386/52 |
| 2009/0052519 A1* | 2/2009 | Oh et al. | 375/240 |

FOREIGN PATENT DOCUMENTS

| | | |
|---|---|---|
| JP | 2001-309306 | 11/2001 |
| JP | 2002-175670 | 6/2002 |
| JP | 2005-217556 | 8/2005 |
| JP | 2006-262483 | 9/2006 |

(Continued)

OTHER PUBLICATIONS

Japanese Office Action issued Dec. 4, 2012 in corresponding Japanese Patent Application No. 2011-503607.

(Continued)

*Primary Examiner* — Sath V Perungavoor
*Assistant Examiner* — Kate Luo
(74) *Attorney, Agent, or Firm* — Staas & Halsey LLP

(57) ABSTRACT

A data transmitting device is for transmitting data including video image information that is inter-frame encoded. The data transmitting device includes an identification information inserting unit configured to insert, in the data to be transmitted by the data transmitting device, video image identification information for identifying the video image information included in the data; and a video image information inserting unit configured to insert the video image information in the data to be transmitted by the data transmitting device. The video image information inserting unit inserts in the data the video image information that has been inter-frame encoded, behind the video image identification information that has been inserted in the data by the identification information inserting unit.

11 Claims, 13 Drawing Sheets

(56) References Cited

FOREIGN PATENT DOCUMENTS

JP 2008-245061 10/2008
WO 98/43423 10/1998

OTHER PUBLICATIONS

International Search Report for PCT/JP2009/054682, Mailed Jun. 30, 2009.

* cited by examiner

FIG.1

| SYNTAX | BIT NUMBER |
|---|---|
| transport_packet(){ | |
|     sync_byte | 8 |
|     transport_error_indicator | 1 |
|     payload_unit_start_indicator | 1 |
|     transport_priority | 1 |
|     PID | 13 |
|     transport_scrambling_control | 2 |
|     adaptation_field_control | 2 |
|     continuity_counter | 4 |
|     if(adaptation_field_control=='10' \|\| adaptation_field_control=='11'){ | |
|         adaptation_field() | |
|     } | |
|     if(adaptation_field_control=='01' \|\| adaptation_field_control=='11'){ | |
|         for (i=0;i<N;i++){ | |
|             data_byte | 8 |
|         } | |
|     } | |
| } | |

FIG.2

| SYNTAX | BIT NUMBER |
|---|---|
| program_association_section(){ | |
|     table_id | 8 |
|     section_syntax_indicator | 1 |
|     '0' | 1 |
|     reserved | 2 |
|     section_length | 12 |
|     transport_stream_id | 16 |
|     reserved | 2 |
|     version_number | 5 |
|     current_next_indicator | 1 |
|     section_number | 8 |
|     last_section_number | 8 |
|     for(i=0; i<N; i++){ | |
|         program_number | 16 |
|         reserved | 3 |
|         if(program_number == '0'){ | |
|             network_PID | 13 |
|         } | |
|         else{ | |
|             program_map_PID | 13 |
|         } | |
|     } | |
|     CRC_32 | 32 |
| } | |

FIG.3

| SYNTAX | BIT NUMBER |
|---|---|
| TS_program_map_section(){ | |
|     table_id | 8 |
|     section_syntax_indicator | 1 |
|     '0' | 1 |
|     reserved | 2 |
|     section_length | 12 |
|     program_number | 16 |
|     reserved | 2 |
|     version_number | 5 |
|     current_next_indicator | 1 |
|     section_number | 8 |
|     last_section_number | 8 |
|     reserved | 3 |
|     PCR_PID | 13 |
|     reserved | 4 |
|     program_info_length | 12 |
|     for(i=0; i<N; i++){ | |
|         descriptor() | |
|     } | |
|     for(i=0; i<N1; i++){ | |
|         stream_type | 8 |
|         reserved | 3 |
|         elementary_PID | 13 |
|         reserved | 4 |
|         ES_info_length | 12 |
|         for(i=0; i<N2; i++) { | |
|             descriptor() | |
|         } | |
|     } | |
|     CRC_32 | 32 |
| } | |

FIG.7

|  | 7 | 6 | 5 | 4 | 3 | 2 | 1 | 0 |
|---|---|---|---|---|---|---|---|---|
| [0] | V | | P | X | CC | | | |
| [1] | M | | PT | | | | | |
| [2] | SEQUENCE NUMBER | | | | | | | |
| [3] | | | | | | | | |
| [4] | TIME STAMP | | | | | | | |
| [5] | | | | | | | | |
| [6] | | | | | | | | |
| [7] | | | | | | | | |
| [8] | SYNCHRONIZATION TRANSMISSION SOURCE (SSRC) IDENTIFIER | | | | | | | |
| [9] | | | | | | | | |
| [10] | | | | | | | | |
| [11] | | | | | | | | |
| [12] | CONTRIBUTION TRANSMISSION SOURCE (CSRC) IDENTIFER | | | | | | | |
| [13] | (LISTED CORRESPONDING TO NUMBER OF CC | | | | | | | |
| [14] | THERE MAY BE CASES WITH NONE) | | | | | | | |
| [15] | | | | | | | | |

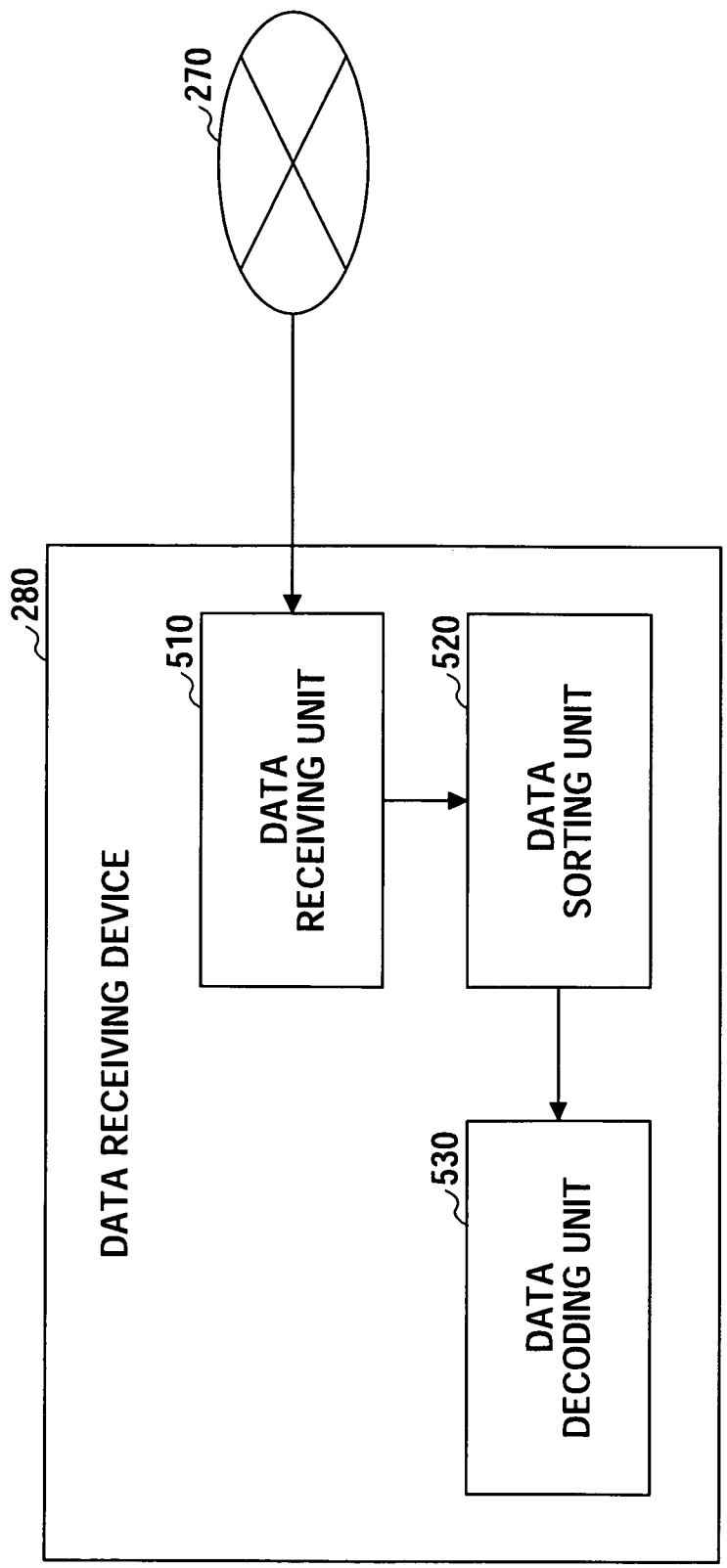

DATA TRANSMITTING DEVICE AND DATA TRANSMITTING AND RECEIVING SYSTEM

CROSS-REFERENCE TO RELATED APPLICATION

This patent application is Continuation of and claims the benefit of priority under 35 USC 120 and 365(c) of PCT application PCT/JP2009/054682 filed in Japan on Mar. 11, 2009, the entire contents of which are incorporated herein by reference.

FIELD

The embodiments discussed herein are related to a system for transmitting and receiving data including encoded video image information.

BACKGROUND

Recently, there is increased demand for streaming video image data in a real-time manner via various communication means such as the Internet. Particularly recently, in digital broadcasting and Internet television, it has become common to perform real-time data distribution by transport streaming specified by MPEG2, which is a technology of compressing and multiplexing video images and audio (see patent document 1).

When the transport stream specified by MPEG2 is received and the video images and audio are reproduced, multiple TS (Transport Stream) packets including information necessary to start reproducing are received, and then the video images and audio are reproduced with the use of information included in the TS packets.

Patent document 1: Japanese Laid-Open Patent Publication No. 2008-245061

However, when video images and audio are reproduced by the above technology, it takes a certain amount of time until all of the TS packets including information needed to start reproduction are received. Therefore, a time lag occurs from the start of data reception until the start of data reproduction.

SUMMARY

According to an aspect of the present invention, a data transmitting device for transmitting data including video image information that is inter-frame encoded, includes an identification information inserting unit configured to insert, in the data to be transmitted by the data transmitting device, video image identification information for identifying the video image information included in the data; and a video image information inserting unit configured to insert the video image information in the data to be transmitted by the data transmitting device, wherein the video image information inserting unit inserts in the data the video image information that has been inter-frame encoded, behind the video image identification information that has been inserted in the data by the identification information inserting unit.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 1 is for describing a structure of a TS packet;

FIG. 2 is for describing a structure of a PAT (Program Association Table) packet;

FIG. 3 is for describing a structure of a PMT (Program Map Table) packet;

FIG. 7 is for describing a structure of an RTP (Real-time Transport Protocol) header;

FIG. 13 is for describing the principle of the operation of the data receiving device according to the present embodiment.

DESCRIPTION OF EMBODIMENTS

Figure 4:
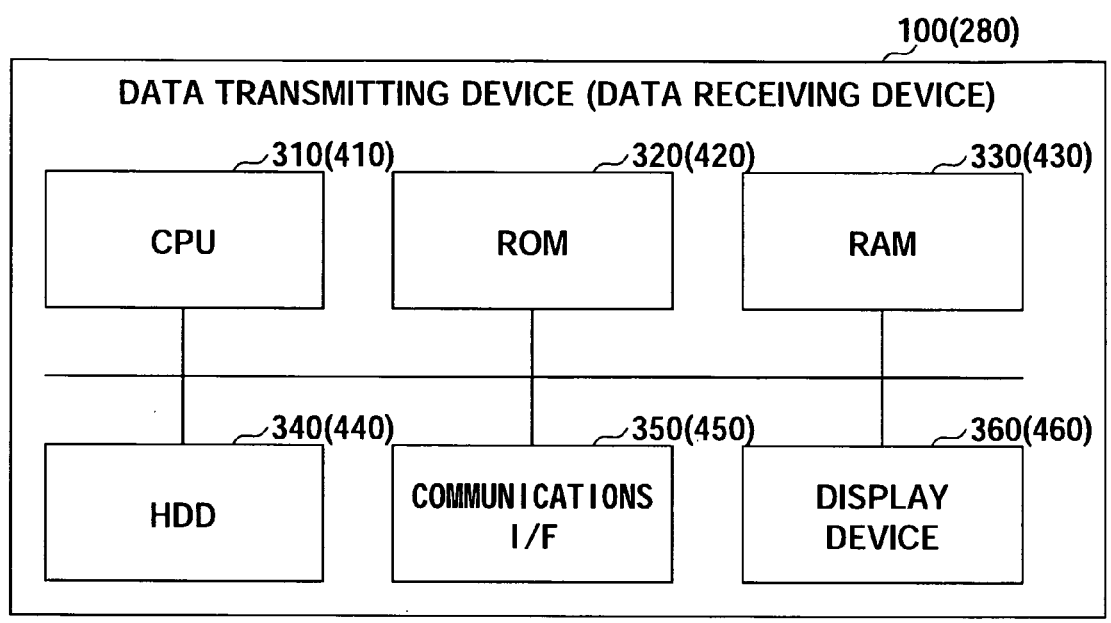
FIG. 4 illustrates an example of a hardware configuration of a data transmitting device and a data receiving device according to the present embodiment.

Preferred embodiments of the present invention will be explained with reference to accompanying drawings. In the following data transmitting device and data receiving device according to the present embodiment, the transport stream specified by MPEG2 is the processing target; however, the present invention is not limited thereto.

Process of Reproducing Video Images and Audio Based on Transport Stream Specified by MPEG2

In a transport stream (hereinafter, "TS") specified by MPEG2, plural video images (MPEG2 standard, H.264 standard, etc.) and audio (MPEG1-Layer2 standard, MPEG-AAC standard, etc.) are multiplexed in a single TS.

In order to reproduce video images and audio from a TS, first, a TS packet of a PAT (Program Association Table) is extracted from the received TS, and a PID (Packet ID) of the PMT (Program Map Table) from the data of the PAT. The PAT is for storing a list of programs included in the TS as a PID list of PMT. The PID of PAT is always zero. The above process is performed by referring to the "PID" indicated in FIG. 1 and the "program_map_PID" indicated in FIG. 2.

Next, to reproduce video images, TS packets of PMT are extracted from the received TS based on the acquired PIDs of PMT, and the PIDs of the video images and audio are acquired from the data of the PMT. The PMT is for storing respective PIDs of images and audio included in the programs, and the above process is performed by referring to the "elementary_PID" indicated in FIG. 3.

In order to reproduce video images, the TS packets of the video images and audio are extracted from the received TS based on the PIDs of the acquired video images and audio, and the data areas of the TS packets of the video images and audio are connected to reproduce an elementary stream. An elementary stream (hereinafter, "ES") is the minimum unit of encoded images and audio.

As information for reproducing an ES from TS packets of video images and audio as above, there is a "payload_unit_start_indicator" in the TS packets. When the "payload_unit_start indicator" of a TS packet is "one", it means that the corresponding TS packet is the leading packet of PES (Packetized ES) packets in ES. When the "payload_unit_start_indicator" of a TS packet is "zero", it means that the corresponding TS packet is data located in the midstream of the PES packets. The TS packets up to the one immediately before the "payload_unit_start_indicator" changes from zero to one are extracted, and the extracted TS packets are connected together to reproduce an ES of video images and audio.

In the ES of the video images, video image information items having different video image encoding methods are inserted to enhance the compression efficiency. Examples of the video image information items are an I-Picture (encoded video image in a frame), a P-Picture (inter-frame forward directional prediction encoded video image), and a B-Picture (bidirectional prediction encoded video image). However, when reproducing the ES of video images, the first video image needs to be reproduced based on the I-picture without using information of preceding or succeeding video image frames.

Furthermore, in order to reproduce a TS of video images and audio in a real-time manner, there are cases where clock signals in synchronization with a PCR (Program Clock Reference) transmitted by an encoder of the TS transmitting side, are generated by a decoder of the TS receiving side, and the video images and audio are reproduced in synchronization with the generated clock signals. The PCR is transmitted from the TS transmitting side as TS packets, and PIDs of PCR packets are indicated in the PMT.

Figure 10:
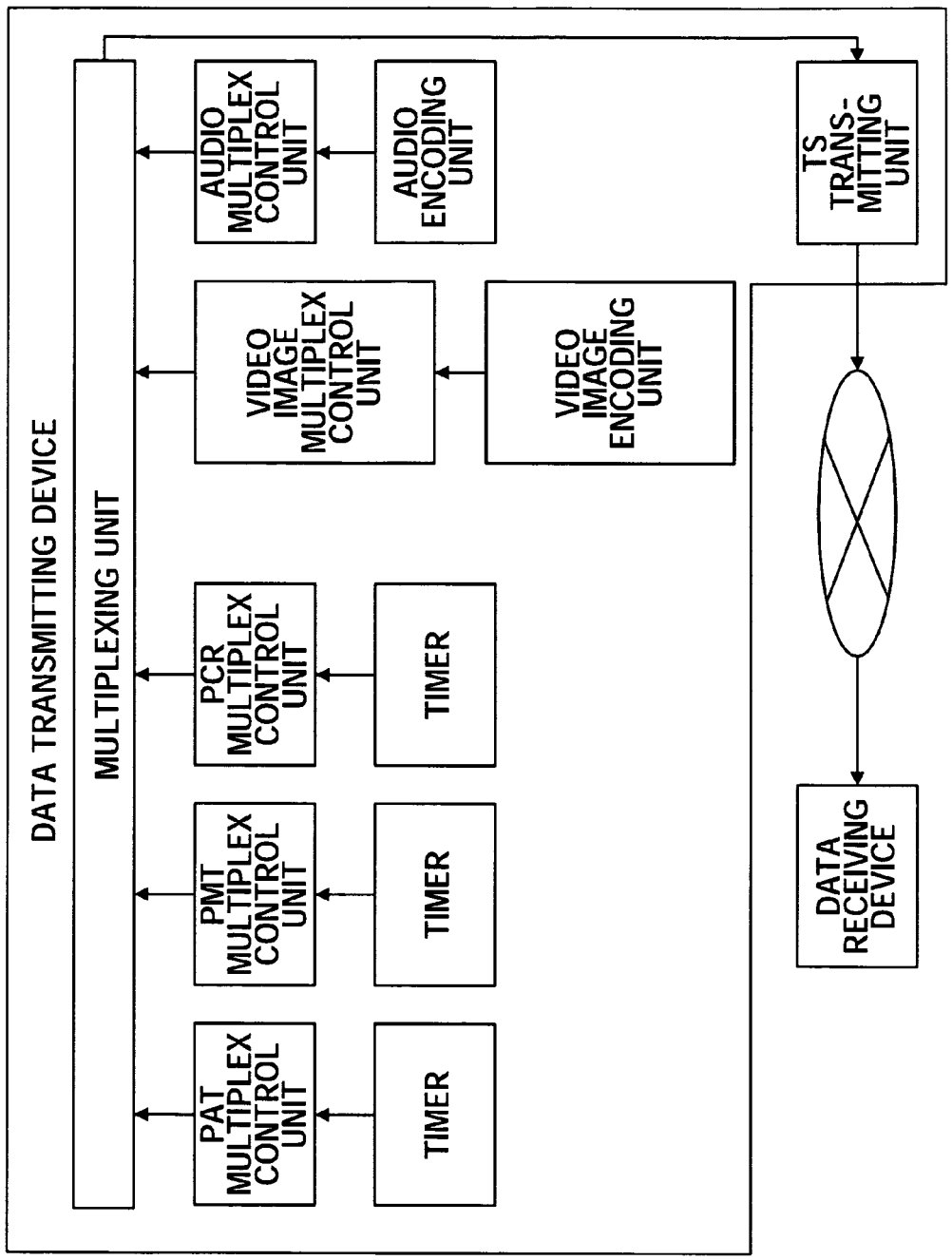
FIG. 10 is a functional block diagram of a data transmitting device according to the conventional technology.

FIG. 10 is a functional block diagram of a data transmitting device according to the conventional technology. As illustrated in FIG. 10, in the data transmitting device according to the conventional technology, various packets are multiplexed by respective units at arbitrary timings. For example, a PAT multiplexing control unit multiplexes PAT packets, a PMT multiplex control unit multiplexes PMT packets, a PCR multiplex control unit multiplexes PCR packets, a video image multiplex control unit multiplexes packets including I-Pictures, and an audio image multiplex control unit multiplexes packets including audio information.

Accordingly, there is no knowing of the order in which these packets may appear in the TS received by the TS receiving device. There may be one or more TS packets between PAT packet and the PMT packet, between the PMT packet and the PCR packet, and between the PCR packet and the I-Picture packet.

When an instruction to start reproducing video images is received, the data receiving device first waits to receive a PAT packet. When a PAT packet is received, the data receiving device waits for a certain amount of time to receive a packet having the same PID as that of the PMT packet indicated in the received PAT packet. Similarly, when referring to a PCR packet and a packet including an I-Picture, the data receiving device waits for a certain amount of time to receive such a packet. Thus, it takes time, from when an instruction to start reproduction is received to when reproduction actually starts.

Figure 11:
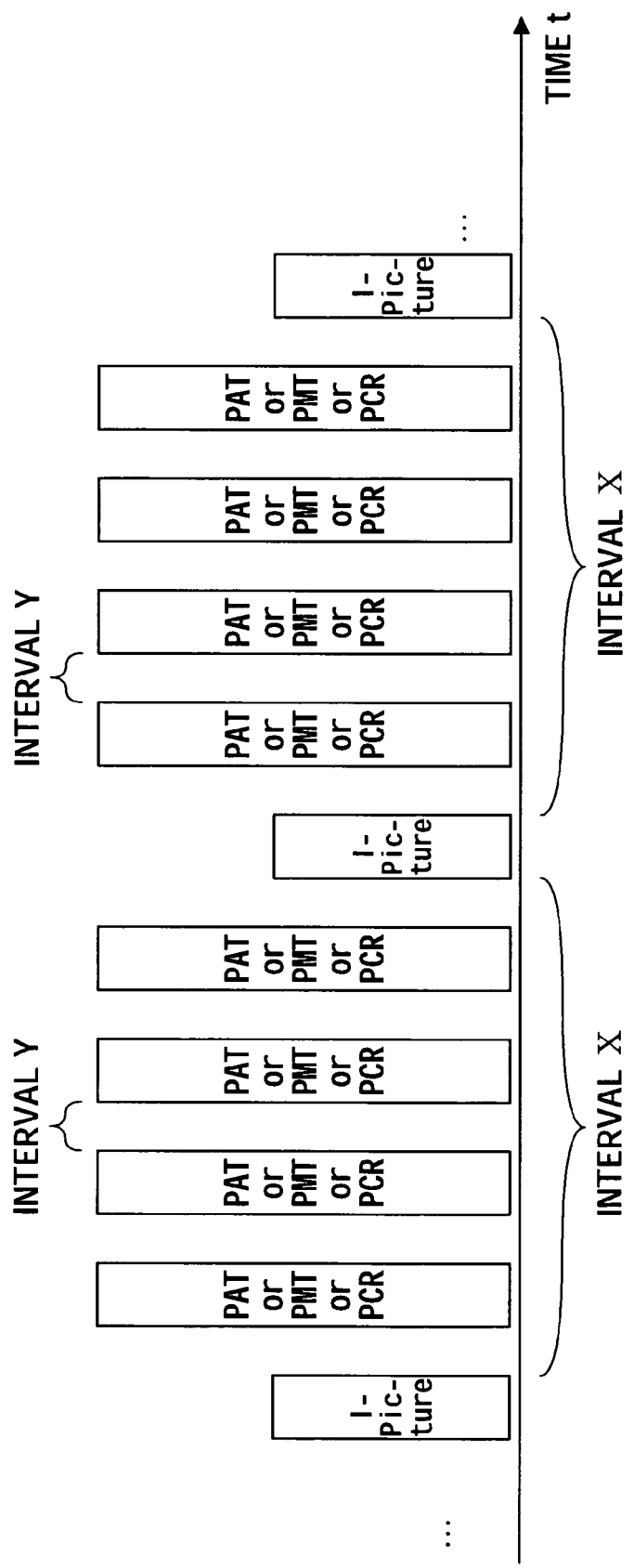
FIG. 11 illustrates data that is transmitted or received in time series according to the conventional technology.

FIG. 11 illustrates an example of a data reception process performed by a data receiving device to which the conventional technology is applied. As illustrated in FIG. 11, at the data receiving unit, I-Picture packets are received at intervals of X, and any one of PAT packets, PMT packets, and PCR packets are received at intervals of Y, where X and Y are different reception intervals. For example, the reception interval X is 500 msec, and the reception interval Y is 100 msec, so that the reception interval X is longer than the reception interval Y. In this case, in consideration of the characteristics of the packets as described above, in order for the data receiving device to start decoding video information based on I-Picture packets, it may take a length of time that is greater than or equal to X from the start of data reception.

A data transmitting device 100 disclosed herein transmits. TS packets in the order of a PAT packet, a PMT packet, a PCR packet, and an I-Picture packet. Therefore, it is possible for the receiving side to smoothly execute a reproduction process. Accordingly, when multiplexed video images and audio are reproduced from TS specified by MPEG2, the receiving side acquires TS packets in the order of a PAT packet, a PMT packet, a PCR packet, and an I-Picture packet, so that the reproduction process is smoothly performed. That is to say, when the TS packets are acquired in the stated order, it is possible to reduce the time taken from when data is received to when the reproduction process is started at receiving side.

Hardware Configuration of Data Transmitting Device According to Present Embodiment With reference to FIG. 4, a description is given of an example of a hardware configuration of the data transmitting device 100 according to the present embodiment. FIG. 4 illustrates an example of a hardware configuration of the data transmitting device 100.

The data transmitting device 100 illustrated in FIG. 4 includes a CPU (Central Processing Unit) 310, a ROM (Read-Only Memory) 320, a RAM (Random Access Memory) 330, a HDD (Hard Disc Drive) 340, a communications I/F (Interface) 350, and a display device 360.

The CPU 310 executes programs stored in the ROM 320, performs calculation processes on data loaded in the RAM 330 according to commands of the programs, and controls the entire data transmitting device 100. The ROM 320 stores programs executed by the CPU 310 and data. The RAM 330 is where programs to be executed and data are loaded when the CPU 310 executes programs stored in the ROM 320. During the calculation, the operation data is temporarily held in the RAM 330. The HDD 340 stores the OS which is basic software and application programs according to the present embodiment in association with relevant data.

The communications I/F 350 is for exchanging data with another peripheral device (a receiving device for receiving a transport stream specified by MPEG2) provided with a communications control function connected to the data transmitting device 100 via a communications network (wired or wireless). The display device 360 is configured with key switches including hard keys and an LCD (Liquid Crystal Display). The display device 360 functions as an interface when the user uses functions of the data transmitting device 100 and the user sets various settings.

As indicated in FIG. 4, a data receiving device 280 also includes a CPU 410, a ROM 420, a RAM 430, an HDD 440, a communications I/F 450, and a display device 460, similar to the data transmitting device 100.

The respective units and elements included in the data transmitting device 100 and the data receiving device 280 may be implemented as the CPU 310 and the CPU 410 respectively execute programs corresponding to units and elements stored in the ROM 320 and the ROM 420 or the HDD 340 and the HDD 440. Furthermore, the respective units and elements included in the data transmitting device 100 and the data receiving device 280 may be implemented as hardware for performing processes relevant to the units and elements.

Figure 5:
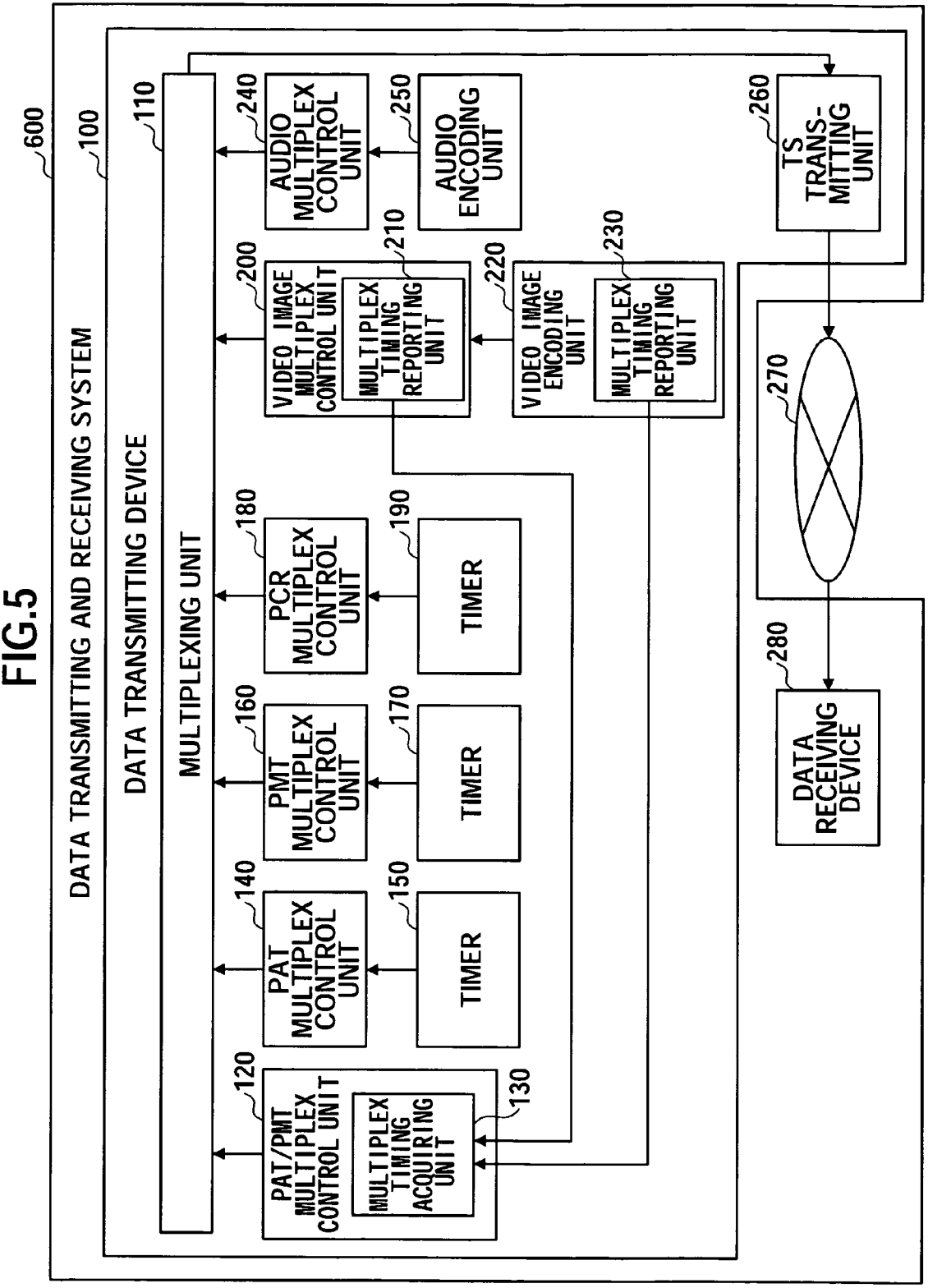
FIG. 5 is for describing the principle of the operation of the data transmitting device according to the present embodiment.

Principle of Operation of Data Transmitting Device According to Present Embodiment With reference to FIG. 5, a description is given of the principle of the operation of the data transmitting device 100. FIG. 5 is for describing the principle of the operation of the data transmitting device 100.

The data transmitting device 100 illustrated in FIG. 5 includes a multiplexing unit 110, a PAT/PMT multiplex control unit 120, a PAT multiplex control unit 140, a PMT multiplex control unit 160, a PCR multiplex control unit 180, and timers 150, 170, and 190. Furthermore, the data transmitting device 100 includes a video image multiplex control unit 200, a video image encoding unit 220, an audio multiplex control unit 240, an audio encoding unit 250, and a TS transmitting unit 260.

The data transmitting device 100 is connected to the data receiving device 280 via an IP network 270, for example, and transmits a transport stream specified by MPEG2 to the data receiving device 280. The data receiving device 280 decodes the received transport stream, and reproduces video images and audio. The data transmitting device 100 and the data receiving device 280 are included in a data transmitting and receiving system 600.

The multiplexing unit 110 multiplexes predetermined information in the TS, in accordance with instructions from the PAT/PMT multiplex control unit 120, the PAT multiplex control unit 140, the PMT multiplex control unit 160, the PCR multiplex control unit 180, the video image multiplex control unit 200, and the audio multiplex control unit 240.

When a predetermined report is received from the timer 150, the PAT multiplex control unit 140 instructs the multiplexing unit 110 to multiplex a PAT packet in the TS. The timer 150 sends reports to the PAT multiplex control unit 140 at appropriate time intervals.

When a predetermined report is received from the timer 170, the PMT multiplex control unit 160 instructs the multiplexing unit 110 to multiplex a PMT packet in the TS. The timer 170 sends reports to the PMT multiplex control unit 160 at appropriate time intervals.

When a predetermined report is received from the timer 190, the PCR multiplex control unit 180 instructs the multiplexing unit 110 to multiplex a PCR packet in the TS. The timer 190 sends reports to the PCR multiplex control unit 180 at appropriate time intervals.

The audio encoding unit 250 generates an ES by encoding audio to be multiplexed in the TS, and reports the ES to the audio multiplex control unit 240. The audio encoding unit 250 reports the generated ES to the audio multiplex control unit 240, and reports the timing for multiplexing the ES in the TS.

The audio multiplex control unit 240 instructs the multiplexing unit 110 to multiplex an ES relevant to audio reported from the audio encoding unit 250 in the TS, based on a timing reported from the audio encoding unit 250.

The video image encoding unit 220 generates an ES by encoding video images to be multiplexed in the TS, and reports the ES to the video image multiplex control unit 200. Furthermore, the video image encoding unit 220 reports the generated ES to the video image multiplex control unit 200, and also reports the timing of multiplexing the ES in the TS.

The video image multiplex control unit 200 instructs the multiplexing unit 110 to multiplex the ES relevant to the video image reported from the video image encoding unit 220 in the TS, based on the timing reported from the video image encoding unit 220.

The video image multiplex control unit 200 and the video image encoding unit 220 include a multiplex timing reporting unit 210 and a multiplex timing reporting unit 230, respectively. The multiplex timing reporting unit 210 and the multiplex timing reporting unit 230 send, to the PAT/PMT multiplex control unit 120, a notification that the I-Picture packet is to be multiplexed in the TS, or a report indicating the timing of multiplexing the I-Picture packet in the TS.

As illustrated in FIG. 5, the multiplex timing reporting unit 210 and the multiplex timing reporting unit 230 are respectively provided in the video image multiplex control unit 200 and the video image encoding unit 220. In another example, the multiplex timing reporting unit (210 or 230) may only be included in either one of the video image multiplex control unit 200 or the video image encoding unit 220.

The PAT/PMT multiplex control unit 120 instructs the multiplexing unit 110 to multiplex PAT packets and PMT packets in the TS. Specifically, the PAT/PMT multiplex control unit 120 instructs the multiplexing unit 110 to multiplex the packets in the order of a PAT packet and a PMT packet.

The video image multiplex control unit 200 instructs the multiplexing unit 110 to multiplex the I-Picture packets immediately behind the PMT packet that is multiplexed in the TS based on the multiplex instruction by the PAT/PMT multiplex control unit 120.

According to one embodiment, the PAT/PMT multiplex control unit 120 instructs the multiplexing unit 110 to multiplex the PAT packet, the PMT packet, and the PCR packet in the TS. In this case, the PAT/PMT multiplex control unit 120 gives an instruction to multiplex the packets in the order of the PAT packet, the PMT packet, and the PCR packet.

Then, the video image multiplex control unit 200 instructs the multiplexing unit 110 to multiplex the I-Picture packets immediately behind the PCR packet that is multiplexed in the TS based on the multiplex instruction by the PAT/PMT multiplex control unit 120.

Furthermore, the PAT/PMT multiplex control unit 120 includes a multiplex timing acquiring unit 130. The multiplex timing acquiring unit 130 acquires a report of multiplexing I-Picture packets in the TS reported by the multiplex timing reporting units 210, 230, or a report of the timing for multiplexing the I-Picture packets in the TS.

According to one embodiment of the PAT/PMT multiplex control unit 120, when the multiplex timing acquiring unit 130 acquires either one of the above reports, the PAT/PMT multiplex control unit 120 gives the above described multiplex instruction to the multiplexing unit 110.

Figure 12:
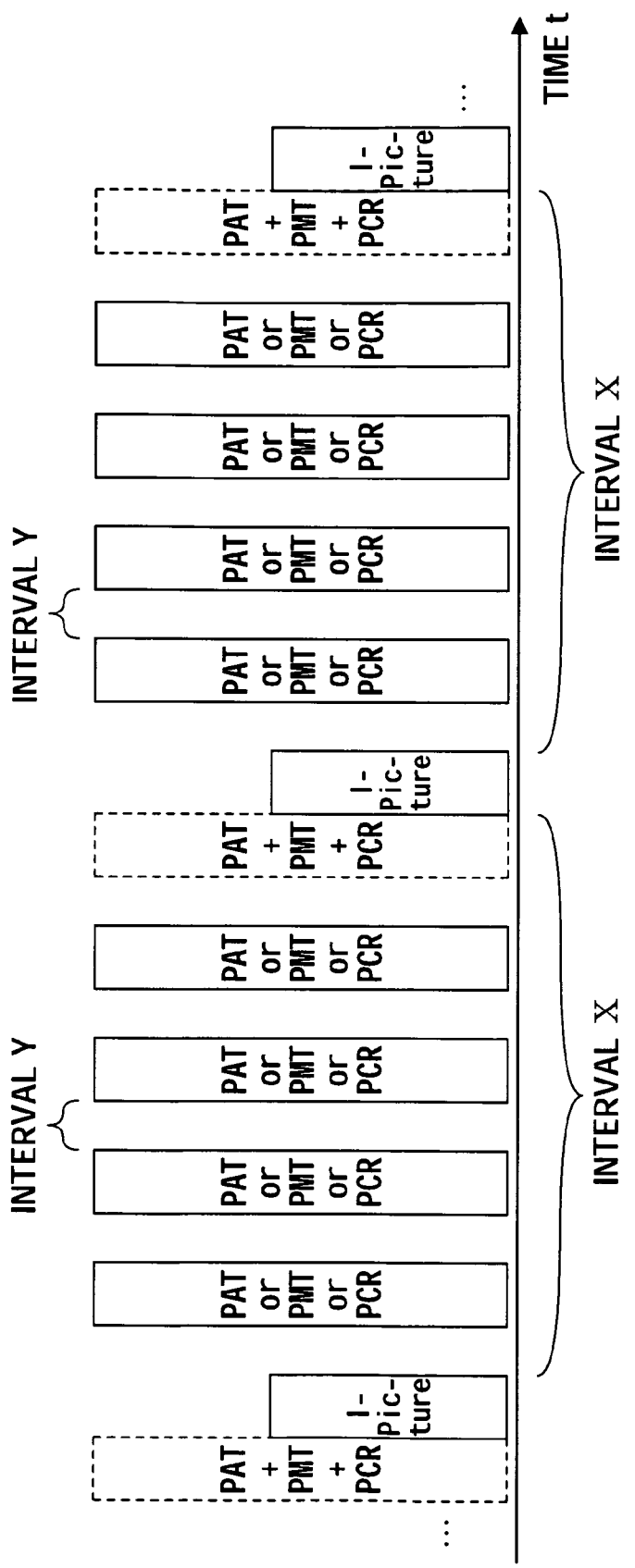
FIG. 12 illustrates data that is transmitted or received in time series according to the present embodiment.

FIG. 12 is for describing an overview of the TS that is transmitted by the data transmitting device 100 (or received by the data receiving device 280). As illustrated in FIG. 12, the data transmitting device 100 multiplexes the packets in the TS, in the order of the PAT packet, the PMT packet, the PCR packet, and the I-Picture packet, based on the processes by the PAT/PMT multiplex control unit 120 and the video image multiplex control unit 200 (hereinafter, "multiplex process"). The packets that have been multiplexed by the PAT/PMT multiplex control unit 120 are surrounded by dashed lines in FIG. 12. Thus, by performing the multiplex process, the data transmitting device 100 smoothly performs the process of reproducing the transport stream specified by MPEG2 at the data receiving device 280. At the data receiving device 280, after starting to receive the TS, the data receiving device 280 starts decoding the video image information within the reception interval X (for example, 500 msec) of I-Picture packets. That is to say, comparing the present embodiment with the conventional technology illustrated in FIG. 11, by using the data transmitting device 100 and the data receiving device 280, it is possible for the data receiving device 280 to start decoding the video image information within a relatively short period of time after starting to receive the TS.

Figure 6:
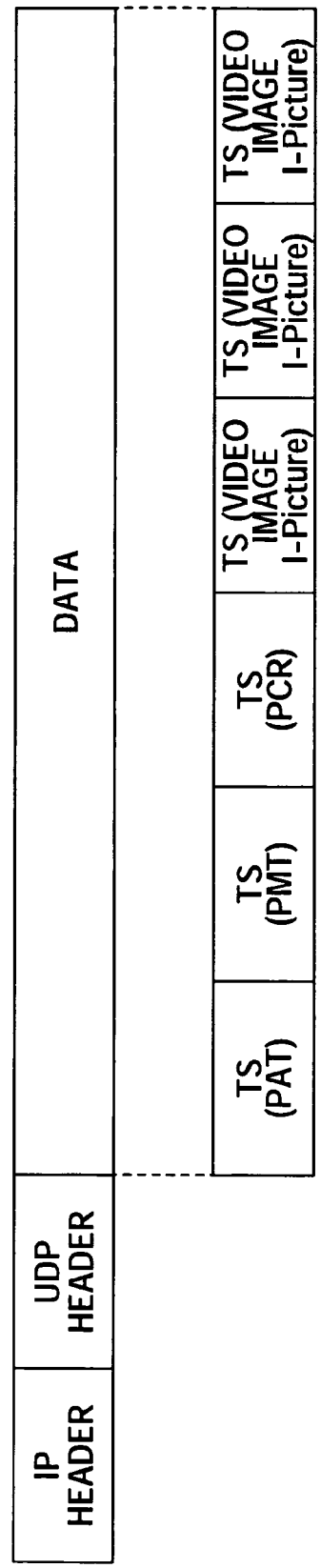
FIG. 6 is for describing the configuration of a packet to be transmitted outside from the data transmitting device according to the present embodiment.

The TS transmitting unit 260 sends, outside the data transmitting device 100, the TS that has been multiplexed at the multiplexing unit 110. As illustrated in FIG. 6, the TS transmitting unit 260 sends, outside the data transmitting device 100, the PAT packet, the PMT packet, the PCR packet, and the I-Picture packets that have been multiplexed in the TS, without changing the order of these packets.

Furthermore, as illustrated in FIG. 6, when the TS transmitting unit 260 transmits the TS outside via the IP network 270, the packets may be arranged in the order of the PAT packet, the PMT packet, the PCR packet, and the I-Picture packets immediately behind the header part of the transmission packet. The data transmitting device 100 transmits data used for a TS reproduction process at the data receiving device 280 in an appropriate order, based on a process performed by the TS transmitting unit 260. Therefore, it is possible for the data receiving device 280 to smoothly perform the process of reproducing the TS. Furthermore, when the TS transmitting unit 260 uses RTP (Real-time Transport Protocol) to transmit the TS outside, the following feature may be added. Specifically, in addition to the above requirements, a marker flag, which is used for identifying a transmission packet that has undergone the multiplex process, may be attached inside the header part of the RTP packet. The above marker flag is attached to the position indicated by "M" in FIG. 7. This process is performed at the data transmitting device 100 and the data receiving device 280 monitors the marker flags, and therefore the position where I-Picture is to be reproduced is easily detected when performing the reproduction process.

Meanwhile, as illustrated in FIG. 13, the data receiving device 280 includes a data receiving unit 510, a data sorting unit 520, and a data decoding unit 530. The data receiving unit 510 receives a TS transmitted from the data transmitting device 100. The data sorting unit 520 sorts the TS packets into video image information, audio information, and other information, based on data attribute identification information included in the PAT packet and the PMT packet extracted from the received TS packet. The data decoding unit 530 decodes the information that has been sorted by the data sorting unit 520.

The data receiving unit 510 monitors the marker flags attached to the RTP packets by the TS transmitting unit 260. When a marker flag is detected, the data receiving unit 510 determines that the received TS has undergone the multiplex process. Then, the data receiving unit 510 executes the decoding process of video image information, on the TS packets following the received TS determined as being a TS that has undergone the multiplex process. Accordingly, when the reproduction process is performed at the data receiving device 280, the position where I-Picture is to be reproduced is easily detected. In the data receiving device 280, after the position where I-Picture is to be reproduced is detected, only the information processing for decoding is to be performed. Therefore, it is possible to reduce the load of the data attribute identification process on the TS packet at the data receiving device 280.

In the present embodiment, the PAT/PMT multiplex control unit 120, the video image multiplex control unit 200 or the video image encoding unit 220, the multiplex timing acquiring unit 130, and the TS transmitting unit 260 correspond to the identification information inserting unit, the video image information inserting unit, the insertion timing acquiring unit, and the data transmitting unit, respectively.

Figure 8:
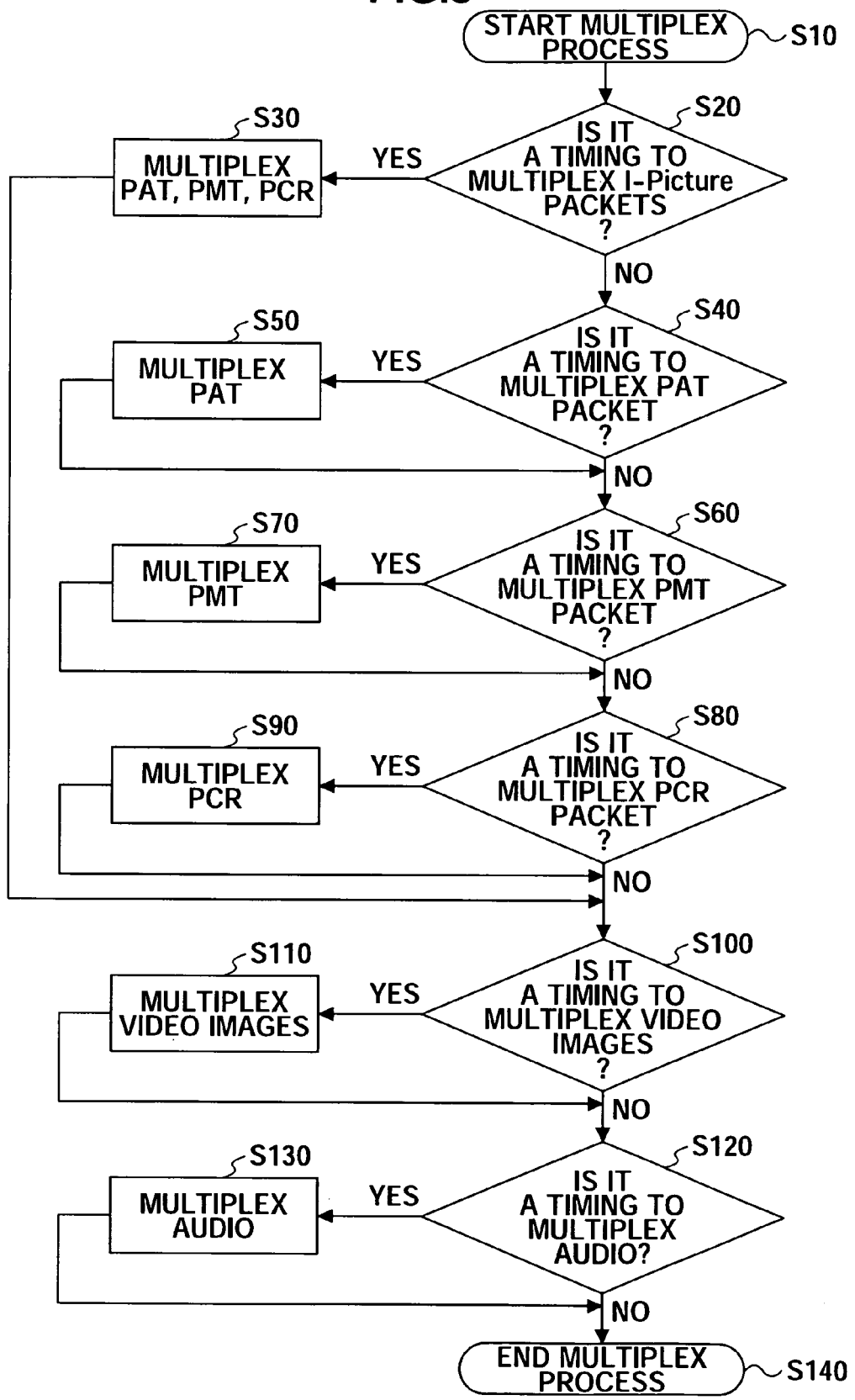
FIG. 8 is a flowchart of a multiplex process performed by the data transmitting device according to the present embodiment.
Figure 9:
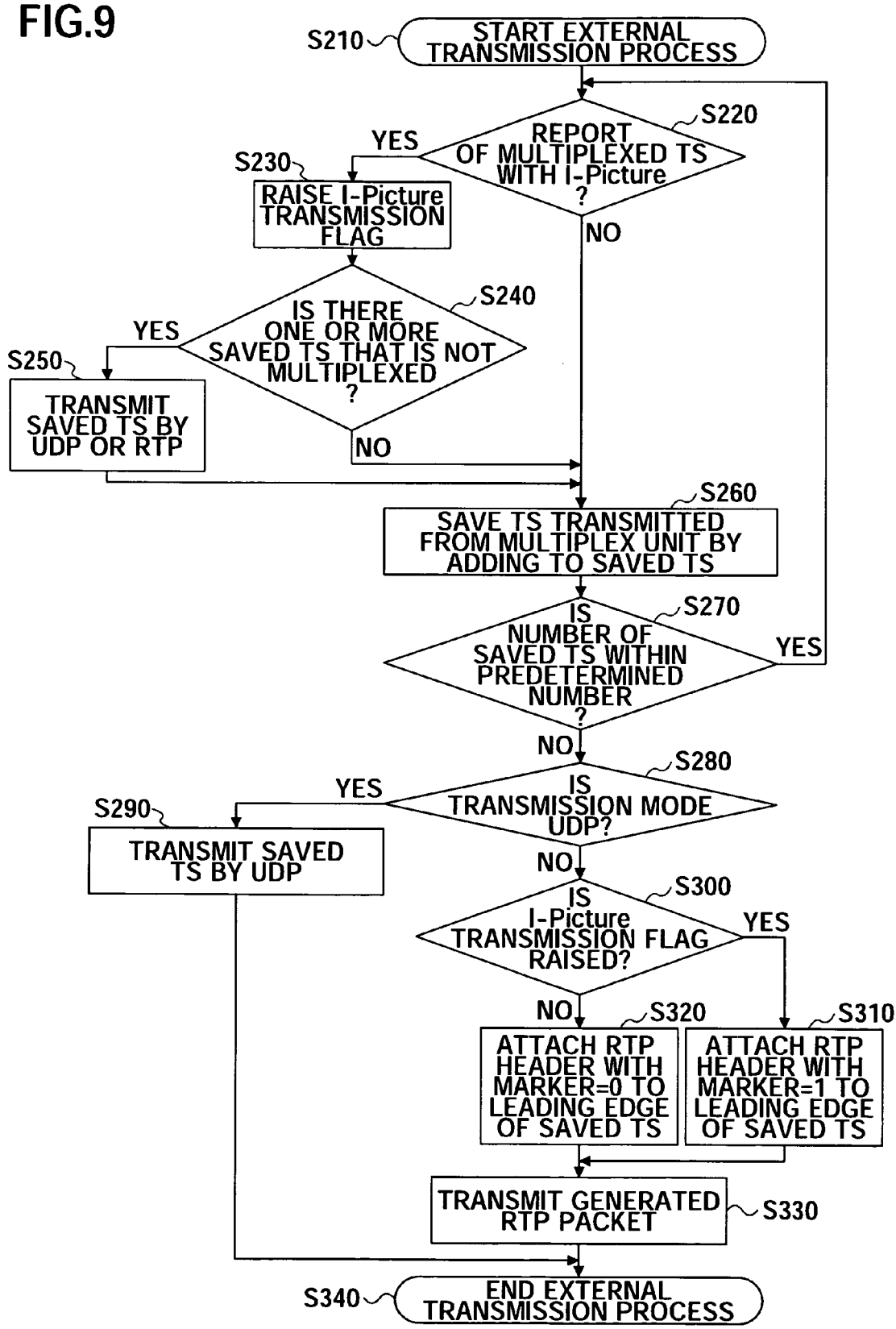
FIG. 9 is a flowchart of an external transmission process performed by the data transmitting device according to the present embodiment.

Example Process Performed by Data Transmitting Device According to Present Embodiment With reference to FIGS. 8 and 9, a description is given of a process example performed by the data transmitting device 100 according to the present embodiment.

(1) Example of Multiplex Process Performed by Data Transmitting Device According to Present Embodiment With reference to FIG. 8, a description is given of an example of a multiplex process performed by the data transmitting device 100. FIG. 8 is a flowchart of a multiplex process performed by the data transmitting device 100.

In step S10, the data transmitting device 100 starts a multiplex process of TS. In step S20, the data transmitting device 100 determines whether a timing to multiplex the I-Picture packets has approached. Specifically, in step S20, when the multiplex timing acquiring unit 130 receives a report of a timing to multiplex the I-Picture packets from the video image multiplex control unit 200 or the video image encoding unit 220 (YES in step S20), the process proceeds to step S30. Meanwhile, in step S20, when the multiplex timing acquiring unit 130 does not receive such a report (NO in step S20), the process proceeds to step S40.

In step S30, the PAT/PMT multiplex control unit 120 instructs the multiplexing unit 110 to multiplex the packets in the TS in the order of the PAT packet, the PMT packet, and the PCR packet. In step S30, the multiplexing unit 110 multiplexes the PAT packet, the PMT packet, and the PCR packet in accordance with the instruction.

In step S40, the data transmitting device 100 determines whether it is a timing to multiplex the PAT packet. Specifically, in step S40, when the PAT multiplex control unit 140 receives a report from the timer 150 (YES in step S40), in step S50, the PAT multiplex control unit 140 instructs the multiplexing unit 110 to multiplex the PAT packet in the TS. Then, in step S50, the multiplexing unit 110 multiplexes the PAT packet in the TS. In step S40, when the PAT multiplex control unit 140 does not receive a report from the timer 150 (NO in step S40), the process proceeds to step S60.

In step S60, the data transmitting device 100 determines whether it is a timing to multiplex the PMT packet. Specifically, in step S60, when the PMT multiplex control unit 160 receives a report from the timer 170 (YES in step S60), in step S70, the PMT multiplex control unit 160 instructs the multiplexing unit 110 to multiplex the PMT packet in the TS. Then, in step S70, the multiplexing unit 110 multiplexes the PMT packet in the TS. In step S60, when the PMT multiplex control unit 160 does not receive a report from the timer 170 (NO in step S60), the process proceeds to step S80.

In step S80, the data transmitting device 100 determines whether it is a timing to multiplex the PCR packet. Specifically, in step S80, when the PCR multiplex control unit 180 receives a report from the timer 190 (YES in step S80), in step S90, the PCR multiplex control unit 180 instructs the multiplexing unit 110 to multiplex the PCR packet in the TS. Then, in step S90, the multiplexing unit 110 multiplexes the PCR packet in the TS. In step S80, when the PCR multiplex control unit 180 does not receive a report from the timer 190 (NO in step S80), the process proceeds to step S100.

In step S100, the data transmitting device 100 determines whether it is a timing to multiplex the encoded video images. Specifically, in step S100, when the video image multiplex control unit 200 receives a report indicating a timing for multiplexing the video images from the video image encoding unit 220 (YES in step S100), the process proceeds to step S110. In step S100, when the video image multiplex control unit 200 does not receive a report indicating a timing for multiplexing the video images from the video image encoding unit 220 (NO in step S100), the process proceeds to step S120.

In step S110, the video image multiplex control unit 200 instructs the multiplexing unit 110 to multiplex, in the TS, the ES relevant to the video images reported from the video image encoding unit 220. Particularly, when the result of step S20 is YES, in step S110, the video image multiplex control unit 200 instructs the multiplexing unit 110 to multiplex the I-Picture packets reported form the video image encoding unit 220, immediately behind the PCR packet multiplexed in the TS in step S30. Then, in step S110, the multiplexing unit 110 performs the multiplex according to the instruction from the video image multiplex control unit 200.

In step S120, the data transmitting device 100 determines whether it is a timing to multiplex the encoded audio. Specifically, in step S120, when the audio multiplex control unit 240 receives a report indicating a timing for multiplexing the audio from the audio encoding unit 250 (YES in step S120), the process proceeds to step S130. In step S120, when the audio multiplex control unit 240 does not receive a report indicating a timing for multiplexing the audio from the audio encoding unit 250 (NO in step S120), the process proceeds to step S140.

In step S130, the audio multiplex control unit 240 instructs the multiplexing unit 110 to multiplex, in the TS, the ES relevant to the audio reported from the audio encoding unit 250. Then, in step S130, the multiplexing unit 110 performs the multiplex according to the instruction from the audio multiplex control unit 240. In step S140, the data transmitting device 100 ends the multiplex process in TS.

The data transmitting device 100 may perform the multiplex process based on the PAT/PMT multiplex control unit 120 and the video image multiplex control unit 200. Furthermore, by performing the multiplex process, it is possible for the data transmitting device 100 to smoothly perform the process of reproducing the TS specified MPEG2 at the data receiving device 280.

(2) Example of External Transmission Process Performed by Data Transmitting Device According to Present Embodiment With reference to FIG. 9, a description is given of an example of an external transmission process performed by the data transmitting device 100. FIG. 9 is a flowchart of an external transmission process performed by the data transmitting device 100.

In step S210, the data transmitting device 100 starts an external transmission process of TS. In step S220, when the data to be externally transmitted (to be transmitted outside) is a TS that has undergone the multiplex process (YES in step S220), in step S230, the TS transmitting unit 260 raises an I-Picture transmission flag. Meanwhile, in step S220, when the data to be externally transmitted is a TS that has not undergone the multiplex process (NO in step S220), in step S260, the TS transmitting unit 260 saves the TS sent from the multiplexing unit 110 by adding it to a TS that is temporarily saved in the RAM 330.

In step S240, when there is one or more temporarily saved TS that has not undergone the multiplex process (YES in step S240), in step S250, the TS transmitting unit 260 transmits outside all TS that have not undergone the multiplex process, with the use of UDP (User Datagram Protocol) or RTP.

In step S240, when there is not one temporarily saved TS that has not undergone the multiplex process (NO in step S240), in step S260, the TS transmitting unit 260 saves the TS that has been transmitted from the multiplexing unit 110 by adding it to a TS that is temporarily saved in the RAM 330. When adding the TS to a temporarily saved TS, the TS's are saved in an order that the TS transmitting unit 260 receives the TS's from the multiplexing unit 110. By saving the TS's in this order, it is possible to externally transmit the TS's in the order they are multiplexed by the multiplexing unit 110.

In step S240, when there is one or more temporarily saved TS that has not undergone the multiplex process (YES in step S240), by transmitting the TS at step S250, it is possible to dispose the PAT information (PAT packet) immediately behind the header part of the transmission packet.

In step S270, when the number of TS's temporarily saved in the RAM 330 is within a predetermined number (YES in step S270), the process returns to step S220. In step S270, when the number of TS's temporarily saved in the RAM 330 exceeds a predetermined number (NO in step S270), the process proceeds to step S280.

In step S280, when the transmission mode of the external transmission performed by the TS transmitting unit 260 is UDP (YES in step S280), in step S290, the TS transmitting unit 260 uses UDP to transmit outside all of the temporarily saved TS's. In step S290, the TS transmitting unit 260 transmits outside the PAT packet, the PMT packet, the PCR packet, and the I-Picture packets that have been multiplexed in the TS, without changing this order.

The data transmitting device 100 transmits data used for a TS reproduction process at the data receiving device 280 in the appropriate order, based on a process performed by the TS transmitting unit 260. Therefore, it is possible for the data receiving device 280 to smoothly perform the process of reproducing the TS.

In step S280, when the transmission mode of the external transmission performed by the TS transmitting unit 260 is not UDP (NO in step S280), the process proceeds to step S300. In step S300, when an I-Picture flag is raised (YES in step S300), in step S310, the TS transmitting unit 260 attaches, to the leading edge of a temporarily saved TS, an RTP header having a marker flag indicating "1".

In step S300, when an I-Picture flag is not raised (NO in step S300), in step S320, the TS transmitting unit 260 attaches, to the leading edge of a temporarily saved TS, an RTP header having a marker flag indicating "0".

In step S330, the TS transmitting unit 260 transmits outside the generated RTP packet, and in step S340, the data transmitting device 100 ends the external transmission process of TS. The data receiving device 280 receives the TS transmitted by the data transmitting device 100, and monitors the marker flag in the received RTP header, to detect a position where I-Picture is to be reproduced.

At the data receiving device 280 that has received the packet transmitted by the data transmitting device 100, the PMT packet is received immediately after the PAT packet, the PCR packet is received immediately after the PMT packet, and the I-Picture packet is received immediately after the PCR packet. Accordingly, there is no need to wait for a certain amount of time to receive a necessary packet after receiving a packet transmitted by a data transmitting device according to the conventional technology as described above. Furthermore, to install the data transmitting device 100, there is no need to change the functions or the hardware of the data receiving device 280 whatsoever.

Overview

With the data transmitting device according to one embodiment, when the data receiving device reproduces video images based on encoded video image information transmitted from the data transmitting device, it is possible to start the reproduction process within a short period of time from when the data receiving device starts receiving the data.

The present invention is not limited to the specific embodiments described herein, and variations and modifications may be made without departing from the scope of the present invention.

According to an aspect of the present invention, a data transmitting device and a data transmitting and receiving system are provided, which are capable of starting a reproduction process within a short length of time from the start of data reception, when a receiver reproduces video images based on encoded video image information transmitted from the data transmitting device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transmitting device for transmitting data including video image information that is inter-frame encoded, the data transmitting device comprising:
   an identification information inserting unit configured to insert, in data to be transmitted by the data transmitting device, video image identification information for identifying video image information included in the data; and
   a video image information inserting unit configured to insert the video image information in the data to be transmitted by the data transmitting device, wherein
   when receiving, from the video image information inserting unit, a report indicating a timing to insert intra-frame encoded video image information in the data, the identification information inserting unit inserts the video image identification information and clock information in the data in the stated order, and then the video image information inserting unit inserts the intra-frame encoded video image information in the data immediately behind the clock information that has been inserted in the data by the identification information inserting unit, the clock information being used for synchronizing with a device with which the data is exchanged, and
   when the data transmitting device transmits the data with the use of an RTP (Real-time Transport Protocol), the data transmitting device attaches, in a header part of an RTP packet, a marker flag indicating that the data includes the video image identification information, the clock information, and the intra-frame encoded video image information arranged in the stated order.

2. The data transmitting device according to claim 1, wherein the identification information inserting unit includes an insertion timing acquiring unit configured to acquire, from the video image information inserting unit, the report indicating the timing to insert the intra-frame encoded video image information in the data.

3. The data transmitting device according to claim 1, further comprising:
   a data transmitting unit configured to transmit the data outside the data transmitting device via an IP network, wherein
   the data transmitting unit does not change the order of the video image identification information, the clock information, and the intra-frame encoded video image information in the data, and locates the video image identification information immediately behind a header part of a transmission packet, when transmitting the data.

4. A data transmitting and receiving system comprising:
   the data transmitting device according to claim 1; and
   a data receiving device including
      a data receiving unit configured to receive the data transmitted by the data transmitting device,
      a data sorting unit configured to extract the video image information from the data based on the video image identification information included in the data received by the data receiving unit, and
      a data decoding unit configured to decode the video image information that has been extracted by the data sorting unit.

5. A data transmitting and receiving system comprising:
   the data transmitting device according to claim 1; and
   a data receiving device including
      a data receiving unit configured to receive the data transmitted by the data transmitting device,
      a data sorting unit configured to extract the video image information from the data based on the video image identification information included in the data received by the data receiving unit, and
      a data decoding unit configured to decode the video image information that has been extracted by the data sorting unit, wherein
      the data receiving unit identifies whether the data of the transmission packet includes the video image identification information, the clock information, and the intra-frame encoded video image information arranged in the stated order, based on the marker flag in the header part of the RTP packet relevant to the data received by the data receiving unit.

6. A non-transitory computer-readable storage medium having a program stored therein for causing a processor of a data transmitting device to execute a method comprising:
   inserting, in data to be transmitted by the data transmitting device, video image identification information for identifying video image information included in the data; and
   inserting the video image information in the data to be transmitted by the data transmitting device, wherein
   when a report, which indicates a timing to insert intra-frame encoded video image information in the data, is received, the video image identification information an clock information are inserted in the data in the stated order, and then the intra-frame encoded video image information is inserted in the data immediately behind the clock information that has been inserted in the data, the clock information being used for synchronizing with a device with which the data is exchanged, and
   when the data is transmitted with the use of an RTP (Real-time Transport Protocol), a marker flag is attached in a header part of an RTP packet, the marker flag being used to indicate that the data includes the video image identification information, the clock information, and the intra-frame encoded video image information arranged in the stated order.

7. The non-transitory computer-readable storage medium according to claim 6, wherein
the inserting of the video image identification information further includes acquiring the report indicating the timing to insert the intra-frame encoded video image information in the data.

8. The non-transitory computer-readable storage medium according to claim 6, the method further comprising:
transmitting the data outside the data transmitting device via an IP network, wherein
the order of the video image identification information, the clock information, and the intra-frame encoded video image information is not changed in the data, and the video image identification information is located behind a header part of a transmission packet, when transmitting the data.

9. A data transmitting device for transmitting a transport stream specified by MPEG2, the data transmitting device comprising:
a PAT/PMT multiplex control unit configured to multiplex PAT (Program Association Table) information including list information of programs relevant to reproducing the transport stream, and PMT (Program Map Table) information including identification information of images and audio corresponding to the programs, as the transport stream; and
a video image multiplex control unit configured to multiplex encoded video image information as the transport stream, wherein
when receiving, from the video image multiplex control unit, a report indicating a timing to multiplex I-Picture information, the PAT/PMT multiplex control unit multiplexes the PAT information, the PMT information, and PCR (Program Clock Reference) information in the stated order, and then the video image multiplex control unit multiplexes the I-Picture information immediately behind the PCR information that is multiplexed by the PAT/PMT multiplex control unit, the PCR information being used for synchronizing with a device with which data of the transport stream is exchanged, and
when the data transmitting device transmits the transport stream with the use of an RTP (Real-time Transport Protocol), the data transmitting device attaches, in a header part of an RTP packet, a marker flag indicating that the PAT information, the PMT information, the PCR information, and the I-Picture information are multiplexed in the transport stream in the stated order.

10. The data transmitting device according to claim 9, wherein
the PAT/PMT multiplex control unit includes a multiplex timing acquiring unit configured to acquire, from the video image multiplex control unit, the report indicating the timing to multiplex the I-Picture information.

11. The data transmitting device according to claim 9, further comprising:
a TS transmitting unit configured to transmit the transport stream outside the data transmitting device via an IP network, wherein
the TS transmitting unit does not change the order of the PAT information, the PMT information, the PCR information, and the I-Picture information in the transport stream, and locates the PAT information immediately behind a header part of a transmission packet, when transmitting the transport stream outside the data transmitting device.

* * * * *

UNITED STATES PATENT AND TRADEMARK OFFICE
CERTIFICATE OF CORRECTION

PATENT NO. : 9,100,672 B2  
APPLICATION NO. : 13/137481  
DATED : August 4, 2015  
INVENTOR(S) : Noriyuki Ihara Page 1 of 1

It is certified that error appears in the above-identified patent and that said Letters Patent is hereby corrected as shown below:

IN THE CLAIMS:

Claim 6, Column 12, Line 58

Delete "an" and insert --and--, therefor.

Signed and Sealed this  
Twenty-sixth Day of April, 2016

Michelle K. Lee  
*Director of the United States Patent and Trademark Office*